Patented May 14, 1940

2,200,734

UNITED STATES PATENT OFFICE 2,200,734

MANUFACTURE OF NITRILES

Herrick R. Arnold and Wilbur A. Lazier, Wilmington, Del., assignors to E. I. du Pont de Nemours & Company, Wilmington, Del., a corporation of Delaware No Drawing. Application September 30, 1938, Serial No. 232,529

19 Claims. (Cl. 260—464)

This invention relates to the production of nitriles and more particularly to a catalytic process for preparing nitriles from organic acids and ammonia, or from the corresponding ammoniated carboxylic compounds.

Accordingly, it is the object of this invention to provide improvements in the catalytic synthesis of nitriles from amides, ammonium salts, or mixtures of ammonia and organic acids. A further object is to provide a new and improved catalyst for use in such a process. A specific object is the catalytic synthesis of adiponitrile from adipic acid and ammonia or from ammoniated compounds of adipic acid by means of catalysts comprising compounds of boron and phosphorus.

These objects are accomplished by means of the following invention, which comprises passing vaporized ammoniated carboxylic compounds of monobasic or dibasic organic acids, such as stearic acid, adipic acid, or the like, together with a substantial excess of ammonia, over a catalyst comprising a compound of boron and phosphorus, under suitable conditions of temperature, pressure, and time of contact, as more fully described in the examples and in the following description.

Although the broad invention is described as involving the use of an organic acid and ammonia, it will be understood that this invention may be practiced by the use of these materials as such or in the form of ammoniated carboxylic compounds such as the amides and ammonium salts, of the organic acids. By this process, nitriles are formed smoothly in high yields, and the pure products may be thereafter isolated as described in the following examples.

In the synthesis of nitriles from acids and ammonia, or compounds thereof, two competing reactions are encountered, one leading to nitrile formation which involves the elimination of water from an ammonium salt, or an amide:

the other leading to the formation of a ketone by decarboxylation of the acid:

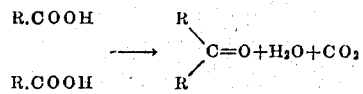

The ketone reaction not only forms an undesirable by-product but the tendency of the ketones to undergo polymerization and decomposition at the temperatures required for nitrile synthesis results in deterioration of the catalyst owing to deposition of carbon and tar on its surface. Boron phosphate, unlike such well-known dehydration catalysts as the oxides of aluminum, thorium, zirconium, silicon, and others, shows a greater preference toward promoting the reactions leading to the formation of nitriles, thus minimizing losses to by-product ketone and maintaining a high degree of activity for a longer time owing to the slower rate at which its surface becomes covered with carbon. Thus, for example, the following catalysts when used for the synthesis of adiponitrile under similar conditions have been observed to give the results tabulated below:

| Catalyst | Conversion to— | | High boiling residue |
|---|---|---|---|
| | Adiponitrile | Cyclopentanone | |
| Thoria | 10.2 | 63.0 | 8.0 |
| Zirconia | 19.5 | 37.0 | 15.0 |
| Aluminum phosphate | 25.5 | 34.0 | 20.0 |
| Silica gel | 77.0 | 13.6 | 6.0 |
| Boron phosphate | 88.0 | 4.0 | 2.5 |

The following examples illustrate, but do not limit, the scope of the invention as set forth in the appended claims.

Example I

A catalyst consisting of boron phosphate was prepared in the following manner: 1730 grams of 85% phosphoric acid ($H_3PO_4$) was placed in an enamel-lined vessel and stirred mechanically with a wooden paddle while sifting in slowly 824 grams of powdered boric acid ($H_3BO_3$— U. S. P. grade). The resulting mixture was then stirred continuously until the boric acid was completely disintegrated, and a smooth, viscous, taffy-like dough was formed. Agitation was then stopped and the charge was allowed to stand at room temperature for 18–20 hours during which time it set to a firm, gelatinous, mass. This product was then dried at 110° C. and baked for 4 hours at a temperature of 350° C. After baking, the hard, brittle, white product consisting essentially of boron phosphate was broken up and screened to a particle size of 8–14 mesh.

A stream of ammonia was passed at the rate of 51.9 grams/hour over 250 cc. of the catalyst maintained at a temperature of 350° C. Twenty-seven hundred thirty grams of adipic acid vapor was passed with the ammonia at a uniform rate during a period of 49 hours. Under these conditions, the molecular ratio of ammonia to adipic acid was 8 to 1, the space velocity was about 310, and the time of contact approximately 5 seconds. In traversing the catalyst, the vapor mixture was dehydrated mainly to adiponitrile and water. The product was condensed and separated into two immiscible layers. After extraction of the aqueous layer, with benzene, and fractional distillation of the combined oil layer and benzene extract, there was obtained 1763 grams of adiponitrile, B. P. 147–148° C./10 mm., 65 grams of cyclopentanone, B. P. 128–130° C. and 51 grams of a high-boiling, tarry residue. The molecular conversions to adiponitrile and ketone were 87.5%, and 4.2%, respectively.

By way of comparison, a silica gel catalyst when used with the same apparatus and raw materials, and under the same operating conditions, gave 77% conversion to adiponitrile, and 13.6% conversion to cyclopentanone. Moreover the activity of the silica gel, expressed in terms of conversion to nitrile, decreased from 77% to 71% in 12 hours, whereas the initial, and final conversions with boron phosphate during 49 hours, were 85.2%, and 86.5% respectively. The intermediate conversion reached a maximum of 90% at the end of 21 hours.

Likewise under similar conditions such well-known dehydration catalysts as alumina, thoria, and Japanese acid clay, gave less than 25% conversion to adiponitrile, and as high as 60% to cyclopentanone.

Example II

A boron phosphate catalyst supported on silica gel was prepared in the following manner: 58 grams of 85% phosphoric acid was dissolved in 300 cc. of water and heated to boiling. There was then dissolved in the boiling solution 12.4 grams of boric acid after which 300 cc. of silica gel in 8–14 mesh grain size was added and the mass was evaporated to dryness on the steam bath and further dried at 110° C. This catalyst, when used in the synthesis of adiponitrile under the conditions described in Example I, gave 77.7% conversion to adiponitrile, and only 1.8% conversion to cyclopentanone.

Example III

Two hundred eleven pounds of 85% phosphoric acid was placed in a 50 gallon stainless steel kneader equipped with intermeshing, rotating, Z-shaped blades. There was then mixed in 100 lbs. of powdered boric acid forming a thin, milky slurry. Mixing was continued for 6 hours at room temperature during which time the batch increased in viscosity finally becoming a smooth, viscous, dough-like mass. This mass was discharged into stainless steel drying trays and dried for 12 hours at 110° C. after which it was baked for 7 hours at 350° C. The hard, brittle cake which resulted was then crushed through a 10-mesh screen, mixed with 2% powdered graphite, and compressed into cylindrical tablets, $\frac{3}{16}$" in diameter by $\frac{3}{16}$" long.

One and two-tenths cubic feet of the catalyst prepared as described above was charged into a multi-tubular converter and heated to 350° C. Adipic acid was vaporized and passed continuously over the catalyst at the rate of 15 lbs./hour, together with ammonia at the rate of 14 lbs./hour. Under these conditions the molecular ratio of ammonia to adipic acid was 8 to 1, the space velocity was 280, and the time of contact was approximately 5.6 seconds. The run was continued for approximately 200 hours during which time an average molecular conversion of adipic acid to adiponitrile amounting to approximately 79% was maintained with no evidence of catalyst deterioration.

Under the same conditions a silica gel catalyst gave 65–70% initial conversion to nitrile, while at the end of only 50 hours its activity had decreased to a point where it was no longer practicable to continue its use without regeneration.

Example IV

A stream of ammonia was passed at the rate of 27.2 grams per hour over 230 cc. of the catalyst described in Example I above, maintained at a temperature of 360–380° C. Three hundred ninety grams of 12-ketostearic acid vapor was passed with the ammonia at a uniform rate of 70.3 grams per hour during a period of 5.55 hours. Under these conditions the molecular ratio of ammonia to ketostearic acid was 6.8 to 1, the space velocity was 179, and the time of contact approximately 8.5 seconds. There was thus obtained a product consisting of 311 grams of oil, and 75 grams of water. Fractional distillation of the oil yielded 157 grams of ketostearonitrile equivalent to 43% conversion of the ketostearic acid, together with 76 grams of low-boiling foreshots, the remainder consisting of a high-boiling residue containing unconverted amide, and tarry matter.

Example V

A stream of ammonia was passed at the rate of 35.3 grams per hour over 210 cc. of the boron phosphate catalyst described in Example I, maintained at a temperature of 360–370° C. Eight hundred eighty grams of β-tertiary-butyladipic acid was passed with the ammonia at the rate of 72.7 grams per hour for a period of 12.1 hours. Under these conditions the molecular ratio of ammonia to acid was 5.79 to 1, the space velocity was 260, and the time of contact was approximately 6.0 seconds. There was thus obtained a product consisting of 601 grams of oil, and 370 grams of water. Fractional distillation of the oil yielded 431 grams of tertiary-butyladipontrile, B. P. 130° C./1.5 mm., 108 grams of tertiary butylcyclopentanone, B. P. 56.5–58° C./2.5 mm., and 50.3 grams of a high-boiling tarry residue. The molecular conversions to tertiary butyladiponitrile and tertiary butylcyclopentanone were 60.3% and 17.6% respectively.

Example VI

A stream of ammonia was passed at the rate of 32.3 grams per hour over 173 cc. of a boron phosphate catalyst prepared as described in Example I, maintained at a temperature of 400° C. Two hundred thirty four grams of a mixture consisting of 40% and 60% respectively of the $C_{11}$ and $C_{12}$ dibasic acids obtained from the oxidation of 12-hydroxystearic acid, was passed with the ammonia at the rate of 55.8 grams/hour for a period of 4.2 hours. Under these conditions the molecular ratio of ammonia to acids was 7.6 to 1, the space velocity was 278, and the time of contact approximately 5.2 seconds. There was thus obtained 179 grams of an oil which on analysis was found to contain 29.5 grams of the dinitrile of the $C_{11}$ dibasic acid, and 96.7 grams of the dinitrile of the $C_{12}$ acid. The molecular conversions to $C_{11}$ and $C_{12}$ dinitriles amounted to about 15% and 49% respectively.

It will be understood that the application of the catalyst is not limited to the synthesis of the specific nitriles mentioned in the examples, but may be advantageously employed in the synthesis of nitriles generally from both monobasic and dibasic acids or their amides or ammonium salts. For example, the catalysts of this invention may be employed in the preparation of saturated or unsaturated mononitriles from monobasic, fatty acids such as caprylic, lauric, and stearic acids, or oleic, linoleic, or ricinoleic acids as well as from the ammoniated derivatives of these acids. Phthalonitrile or sebaconitrile may be prepared from phthalic or sebacic acids, or mixtures of nitriles may be prepared from mixtures of the corresponding acids and ammonia.

In the preparation of adiponitrile it is preferred to use adipic acid and ammonia as the raw materials. Nevertheless, certain derivatives of adipic acid may also be treated to give the same results. Among these may be mentioned adipamide, adipimide, esters of adipic acid, omega-cyanovaleric acid, adipamic acid, and omega-cyanovaleramide. Depending on their physical properties these materials may be introduced into the reaction chamber either as powdered solids, liquids, gases, or in solution or suspension in suitable solvents.

Broadly speaking, the processes of this invention are operable within the temperature range from 300° C. to 550° C. It is preferred, however, to utilize temperatures within the more restricted range of 350°–450° C. since the majority of acids or ammoniated carboxylic compounds utilized are completely volatile within this temperature range. Superior results are obtained by maintaining all of the reactants in the vapor phase, and the temperature usually employed is somewhat above the boiling point of the least volatile component of the mixture.

The processes of this invention are, preferably, practiced at ordinary pressures although no disadvantages occur, and, in fact, it may at times be desirable, to operate at higher or lower pressures than atmospheric in order to increase the capacity of a given unit of apparatus or to facilitate vaporization of high boiling reactants.

The catalyst may be prepared by any suitable method, but it is preferred to mix boric acid, with 85% phosphoric acid in the cold, preferably at about 10° C., until the slow reaction results in the formation of a stiff, dough-like mass which is then kneaded until it is smooth and uniform, and contains no lumps or grains of boric acid. The product is then dried, and baked at 350° C. until a hard mass is formed which may then be broken up to suitable size, or compressed into tablets. The catalyst may also be formed upon catalyst supports or surface-extending agents such as silica gel, or kieselguhr.

Various changes may be made in the details of this invention without sacrificing the advantages thereof or departing therefrom.

We claim:

1. A process for the production of nitriles which comprises passing, at a temperature between 300 and 550° C., a mixture of ammonia, in molecular excess, and a carboxylic compound, adapted to form an ammoniated carboxylic compound with ammonia, over a compound of boron and phosphorus as a catalyst.

2. A process for the production of nitriles which comprises passing, at a temperature between 300 and 550° C., a mixture of ammonia, in molecular excess, and an organic acid, adapted to form an ammoniated carboxylic compound with ammonia, over a compound of boron and phosphorus as a catalyst.

3. A process for the production of nitriles which comprises passing, at a temperature between 300 and 550° C., a mixture of ammonia and a carboxylic compound, adapted to form an ammoniated carboxylic compound with ammonia, over a compound of boron and phosphorus as a catalyst.

4. A process for the production of nitriles which comprises passing, at a temperature between 350 and 450° C., a mixture of ammonia and a carboxylic compound, adapted to form an ammoniated carboxylic compound with ammonia, over a compound of boron and phosphorus as a catalyst.

5. A process for the production of nitriles which comprises passing, at a temperature between 300 and 550° C., a mixture of ammonia and a carboxylic compound, adapted to form an ammoniated carboxylic compound with ammonia, over a boron phosphate catalyst.

6. A process for the production of adiponitrile which comprises passing, at a temperature between 300 and 550° C., a mixture of ammonia and adipic acid over a compound of boron and phosphorus as a catalyst.

7. A process for the production of adiponitrile which comprises passing, at a temperature between 300 and 550° C., a mixture of ammonia, in molecular excess, and adipic acid over a compound of boron and phosphorus as a catalyst.

8. A process for the production of adiponitrile which comprises passing, at a temperature between 350 and 450° C., a mixture of ammonia and adipic acid over boron phosphate as a catalyst.

9. A process for the production of adiponitrile which comprises passing, at a temperature between 300 and 550° C., a mixture of ammonia and adipic acid over boron phosphate as a catalyst.

10. The process for the production of nitriles which comprises passing, at a temperature between 300 and 550° C., an ammoniated carboxylic compound over a compound of boron and phosphorus as a catalyst.

11. The process for the production of nitriles which comprises passing, at a temperature between 350 and 450° C., an ammoniated carboxylic compound over a compound of boron and phosphorus as a catalyst.

12. The process for the production of nitriles which comprises passing, at a temperature between 350 and 450° C., an ammoniated carboxylic compound over boron phosphate as a catalyst.

13. The process for the production of nitriles which comprises passing, at a temperature between 300 and 550° C., an ammoniated carboxylic compound over boron phosphate as a catalyst.

14. In a process for the production of nitriles by passing over a catalyst, at reacting temperature, a vaporized mixture of ammonia and a carboxylic compound adapted to form an ammoniated carboxylic compound with ammonia, the step which comprises effecting the reaction in the presence of a compound of boron and phosphorus as a catalyst.

15. In a process for the production of nitriles by passing over a catalyst, at reacting temperature, a vaporized mixture of ammonia and a carboxylic compound adapted to form an ammoniated carboxylic compound with ammonia, the step which comprises effecting the reaction in the presence of a boron phosphate catalyst.

16. In a process for the production of long chain fatty acid nitriles by passing over a catalyst, at reacting temperature, a vaporized mixture of ammonia and a long chain fatty acid adapted to form an ammoniated carboxylic compound with ammonia, the step which comprises effecting the reaction in the presence of a compound of boron and phosphorus as a catalyst.

17. In a process for the production of stearo nitrile by passing over a catalyst, at reacting temperature, a vaporized mixture of ammonia and stearic acid, the step which comprises effecting the reaction in the presence of a compound of boron and phosphorus as a catalyst.

18. In a process for the production of dinitriles containing from 6 to 12 carbon atoms by passing over a catalyst, at reacting temperature, a vaporized mixture of ammonia and a dicarboxylic compound containing from 6 to 12 carbon atoms adapted to form an ammoniated carboxylic compound with ammonia, the step which comprises effecting the reaction in the presence of a compound of boron and phosphorus as the catalyst.

19. In a process for the production of phthalo nitrile by passing over a catalyst, at reacting temperature, a vaporized mixture of ammonia and phthalic acid, the step which comprises effecting the reaction in the presence of a compound of boron and phosphorus as a catalyst.

HERRICK R. ARNOLD.
WILBUR A. LAZIER.